(12) United States Patent
Yofu

(10) Patent No.: US 6,408,243 B1
(45) Date of Patent: Jun. 18, 2002

(54) SERVICE DELIVERY SYSTEM

(75) Inventor: Toshihide Yofu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,930

(22) Filed: Oct. 26, 2001

(30) Foreign Application Priority Data

Oct. 26, 2000 (JP) .......................................... 2000-326433
Oct. 26, 2000 (JP) .......................................... 2000-326434

(51) Int. Cl.$^7$ ............................................. G01C 21/00
(52) U.S. Cl. ....................................... 701/209; 701/208
(58) Field of Search .................................. 701/209, 208, 701/207, 210, 213, 201, 202; 455/456, 457

(56) References Cited

U.S. PATENT DOCUMENTS 6,321,158 B1 * 11/2001 DeLormed .................. 701/209
6,327,533 B1 * 12/2001 Chou ......................... 701/207
6,330,453 B1 * 12/2001 Suzuki et al. ................ 455/456
6,330,454 B1 * 12/2001 Verdonk ..................... 701/209
6,334,087 B1 * 12/2001 Hakano et al. ............. 701/208

\* cited by examiner

*Primary Examiner*—Richard M. Camby
(74) *Attorney, Agent, or Firm*—Arent Fox Kintner Plotkin & Kahn, PLLC

(57) ABSTRACT

The invention is a service delivery system comprising: a client side terminal for ordering delivery of various services to a delivery destination, and a shop side terminal for receiving the order information and instructing delivery of the service to the delivery destination. The client side terminal comprises a client side display device for displaying map information and product information on a screen, and an order information transmission device for attaching position information for the delivery destination to the order information and transmitting this combined information. The shop side terminal comprises a shop side display device for displaying map information and product information on a screen and a route information generation device for generating route information for a route to the delivery destination based on the position information.

9 Claims, 8 Drawing Sheets

FIG. 5

My Garage

Hello, Mr. Murata

UV-cut glass has now become the standard. This has recently been developed to cut 99% or more ultraviolet rays.

14th of this month is Seana's birthday. How about sending a rose bouquet?

Selection

Has been opened

Booking is possible

Accommodation information

○ Mail  ② How to use  ○ Setting change  ⊗ Log out  ○ Lounge

4th July

☀ Fine

Released from Mr. Murata's house, 4th July, 6:00am (In detail)

| Date | 5 | 6 | 7 |
|------|---|---|---|
| Weather | | ☀ | ☀ |
| Highest temperature | 24 | 30 | 28 |
| Lowest temperature | 22 | 20 | 21 |
| Probability of precipitation | 60% | 30% | 30% |

(In detail)

Today's fortune-telling
General luck 91%

Feature ▶ Challenge the fishing!

Drive Box

Let's start a driving plan.

Let's gather shop and event information.

(Register the spot)

Let's form own route.

(Design the course)

Recommended selection

Recommendation to Mr. Murata

Recommended drive course (Display All)

▲ Have fun at clear stream in Art Village

Recommended drive spot (Display All)

▲ Kumagaya Fireworks Display

CLIENT

FIG. 6
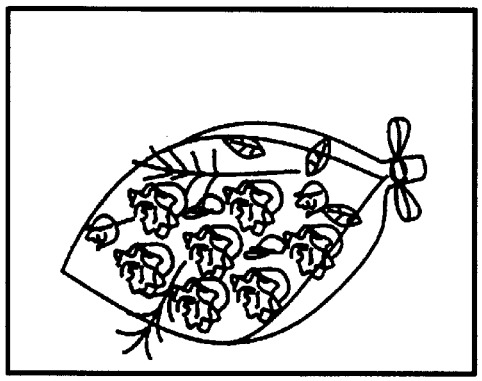
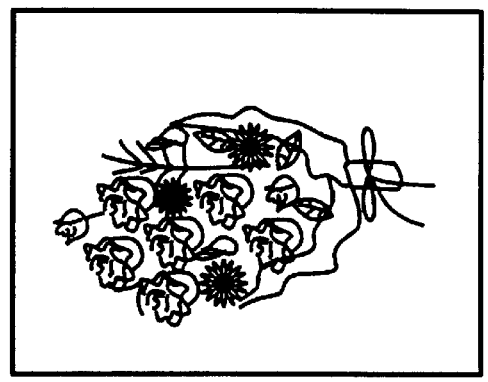
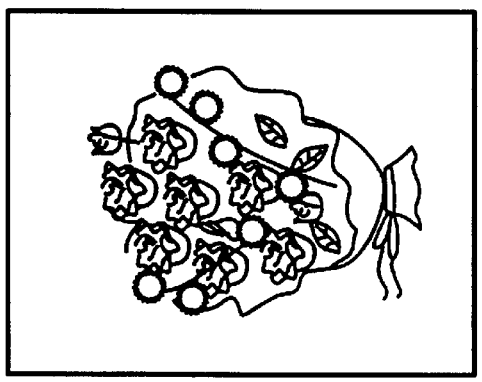

SERVICE DELIVERY SYSTEM

BACKGROUND OF THE INVENTION

1. Field of the Invention

The present invention relates to a service delivery system, which provides various services such as repair services and pick-up services (meeting and farewell services) by moving to a specified predetermined position (that is, a delivery destination), in addition to delivery of goods to the delivery destination. More specifically, the present invention relates to a technique for route guidance at the time of moving to the delivery destination.

Furthermore, the present invention relates to a technique for transmitting order information to a shop side.

2. Description of Related Art

Heretofore, there is known a car navigation system such as disclosed for example in Japanese Unexamined Patent Application, First Publication No. Hei 10-221104, which reads a bar code which has been prepared with the contents of a delivery slip attached to a package as data, to obtain delivery information such as the address, name and telephone number for the delivery destination, and also receives a positioning signal such as a GPS (Global Position System) signal to detect the current position of a delivery vehicle, and generates route information for a route to the delivery destination.

In this car navigation system, when a client makes a request for delivery of a package, to a delivery center controlling pickup and delivery of packages, the delivery center prepares a bar code including the delivery information described therein and attaches this to the package. Then, a delivery vehicle reads the bar code attached to the package, and displays the current position of the vehicle, the position of the delivery destination and the route information on a map display screen of a navigation apparatus.

Moreover, when there is a request made for the picking up of a package, to the delivery center, the delivery center informs the delivery vehicle of the address and name of the pickup destination by means of, for example, PHS (Personal Handy-Phone System), cellular phone, pager or the like. In this case, the driver of the delivery vehicle resets the pickup and delivery route.

In the car navigation system in the above example of the related art, complicated processing is required wherein the order information for a delivery request from a client is converted to a bar code via the delivery slip, and the content of the bar code is taken into the navigation apparatus of the delivery vehicle, causing a problem in that the delivery service cannot be performed efficiently.

Moreover, when there is a request for picking up a package, only the address and name of the pickup destination are advised from the delivery center to the delivery vehicle, and there is a possibility that it cannot be quickly judged whether or not the pickup and delivery route can be changed to pass the pickup destination of the package.

In view of the above situation, it is a first object of the present invention to provide a service delivery system, which can simplify processing processes from receiving order information from a client to preparing the route information, to thereby improve the efficiency of a service delivery business.

Furthermore, delivery is performed only for a case in which a delivery request is transmitted from a client to the delivery center. Hence, for example, in the case where the client forgets to make a delivery request, delivery is not performed, and an unprofitable situation may arise for the client.

In view of the above situation, it is a second object of the present invention to provide a service delivery system, which can simplify processing processes from receiving order information from a client to preparing the route information, to thereby improve the efficiency of a service delivery business, and which can automatically place an order in accordance with information related to the client.

SUMMARY OF THE INVENTION

In order to achieve the first object, a service delivery system of a first aspect of the present invention is a service delivery system comprising: a client side terminal for ordering delivery of various services to a delivery destination (for example, a client side terminal device 11 in a first embodiment described later), and a shop side terminal for receiving the order information and instructing delivery of the service to the delivery destination (for example, a shop side terminal device 13 in the first embodiment described later). The client side terminal comprises a client side display device (for example, a display section 21 in the first embodiment described later) for displaying map information and product information on a screen, and an order information transmission device (for example, an information transmission section 23 in the first embodiment described later) for attaching position information for the delivery destination to the order information and transmitting this combined information. The shop side terminal comprises a shop side display device (for example, a display section 41 in the first embodiment described later) for displaying map information and product information on a screen, and a route information generation device (for example, a route information generation section 42 in the first embodiment described later) for generating route information for a route to the delivery destination based on the position information.

According to the service delivery system having the above construction, since position information (for example, latitude and longitude) for the delivery destination on the map is attached to the order information transmitted from the client side terminal to the shop side terminal, the position of the delivery destination is immediately displayed on the map display screen of the shop side display device of the shop side terminal which has received this order information.

Therefore, based on the position information for the delivery destination and the current position information for the delivery vehicle, the route information can be quickly generated, thereby enabling the efficiency of the delivery business to be improved.

Moreover, a service delivery system of a second aspect of the invention comprises a navigation apparatus (for example, a navigation apparatus 14 in the first embodiment described later) furnished in a vehicle for delivering the service, and the shop side terminal comprises a route information storing device for storing the route information (for example, an information storing section 43 in the first embodiment described later), and the navigation apparatus obtains the route information stored in the route information storing device.

According to the service delivery system having the above construction, the route information generated by the route information generation device of the shop side terminal is stored in a computer readable recording medium, for example a memory such as a hard disk built in to the computer system, or a floppy disk, a magneto-optical disk, a ROM, a CD-ROM, or a portable medium such as an IC card having a flash memory therein.

The navigation apparatus in the delivery vehicle obtains the route information by connecting to the route information storing device via a communication circuit, or by directly reading the route information from a portable medium brought into the delivery vehicle.

In this case, the obtained route information is displayed on the display screen of the navigation apparatus, and hence the delivery vehicle can move to the delivery destination immediately, thereby enabling the delivery business to be quickly performed.

Moreover, a service delivery system of a third aspect of the invention comprises a navigation apparatus furnished in a vehicle for delivering a service, and the navigation apparatus comprises a communication device connected to the client side terminal so as to be able to communicate therewith (for example, a communication section 52 in the embodiment described later), and a vehicle side route information generation device for generating route information for a route to the delivery destination based on the position information received from the client side terminal via the communication device (for example, a route information generation section 54 in the first embodiment described later).

According to the service delivery system having the above construction, since a movable body such as a delivery vehicle can directly receive the order information from the client side terminal without including the shop side terminal therebetween, to generate the route information, efficiency of the delivery business can be further improved.

Furthermore, a service delivery system of a fourth aspect of the invention comprises a server apparatus for transferring the order information transmitted from the client side terminal to the shop side terminal (for example, a navigation server apparatus 12 in the first embodiment described later), and the server apparatus comprises a position information attaching device for attaching position information for the delivery destination to the order information (for example, a position information search section 32 in the first embodiment described later).

According to the service delivery system having the above construction, for example in the client side terminal, even in the case where the position information cannot be attached to the order information, the position information can be attached by the server apparatus based on the address of the delivery destination described in the order information. Hence the shop side terminal and the navigation apparatus in the delivery vehicle having received the order information can display the delivery destination immediately on the map display screen, as well as being able to generate the route information quickly.

As described above, according to the service delivery system of the first aspect of the invention, since the position information for the delivery destination on the map (for example, latitude and longitude) is attached to the order information, the position of the delivery destination is immediately displayed on the map display screen of the shop side display device of the shop side terminal. Based on the position information for the delivery destination and the current position information for the delivery vehicle, the route information can be generated quickly, thereby enabling improvement in the efficiency of the delivery business.

Also, according to the service delivery system of the second aspect of the invention, the obtained route information is displayed on the display screen of the navigation apparatus, and hence immediate movement to the delivery destination is possible, thereby enabling the delivery business to be quickly performed.

Moreover, according to the service delivery system of the third aspect of the invention, for example, the movable body such as the delivery vehicle can directly receive the order information from the client side terminal without including the shop side terminal therebetween, and generate the route information, thereby enabling the efficiency of the delivery business to be further improved.

Furthermore, according to the service delivery system of the fourth aspect of the invention, for example in the client side terminal, even in the case where the position information cannot be attached to the order information, the position information can be attached by the server apparatus based on the address of the delivery destination described in the order information. Hence the shop side terminal and the navigation apparatus in the delivery vehicle having received the order information can display the delivery destination immediately on the map display screen, as well as being able to generate the route information quickly.

In order to achieve the second object, a service delivery system of a fifth aspect of the invention is a service delivery system comprising: a client side terminal (for example, a client side terminal device 111 in a second embodiment described later) for ordering delivery of various services to a delivery destination, a shop side terminal (for example, a shop side terminal device 113 in the second embodiment described later) for receiving the order information and instructing delivery of the service to the delivery destination, and an information server (for example, an information server apparatus 131 in the second embodiment described later) connected to the client side terminal and the shop side terminal so as to be able to communicate therewith. The information server comprises an order information storing device (for example, an order information storing section 144 in the second embodiment described later) for storing a product name and a delivery date and position information for a delivery destination transmitted from the client side terminal, and an order information transmission device (for example, an order information transmission section 143 in the second embodiment described later) for transmitting the product name and the delivery date and the position information for the delivery destination to the shop side terminal, when it is the delivery date or a predetermined number of days before the delivery date. The shop side terminal comprises a display device (for example, a display section 151 in the second embodiment described later) for displaying the position of the delivery destination on a map display screen based on the position information for the delivery destination, and a route information generation device (for example, a route information generation section 153 in the second embodiment described later) for generating route information for a route to the delivery destination based on the position information for the delivery destination.

According to the service delivery system having the above construction, since position information (for example, latitude and longitude) for the delivery destination on the map is attached to the order information transmitted to the shop side terminal, the position of the delivery destination is immediately displayed on the map display screen of the shop side display device of the shop side terminal which has received this order information.

Therefore, based on the position information for the delivery destination and the current position information for the delivery vehicle, the route information can be quickly generated, thereby enabling the efficiency of the delivery business to be improved.

Moreover, since the information server comprises the order information storing device, and the order information is reliably transmitted to the shop side terminal on a predetermined date, then for example the situation can be prevented where transmission of the order information from the client side terminal is forgotten or an ordering error occurs.

Furthermore, a service delivery system of a sixth aspect of the invention is constructed such that the shop side terminal comprises a product information registration device (for example, a product information registration section 152 in the embodiment described later) for registering product information in the information server. The information server comprises a product information storing device (for example, a product information storing section 142 in the second embodiment described later) for storing the product information registered from the shop side terminal, and a product information searching device (for example, a product information search section 141 in the second embodiment described later) for searching the product information stored in the product information storing device, when it is a predetermined number of days before the delivery date, and the order information is generated based on the searched product information and transmitted to the shop side terminal.

According to the service delivery system having the above construction, since the product information can be registered from the shop side terminal, for example, product information satisfying search conditions based on preference information or the like related to the clients can be easily searched from various product information.

Moreover, a service delivery system according to a seventh aspect of the invention comprises a map server connected to at least one of the client side terminal, the shop side terminal and the information server so as to be able to communicate therewith (for example, a map information server apparatus 132 in the second embodiment described later), and the client side terminal and the shop side terminal respectively comprise a display device for displaying the map information received from the map server (for example, display sections 151 and 161 in the second embodiment described later).

According to the service delivery system having the above construction, it is not necessary to hold the map information separately in the client side terminal and the shop side terminal. Hence the construction of the system can be simplified to perform efficient processing.

Furthermore, a service delivery system according to an eighth aspect of the invention comprises a navigation apparatus furnished in a vehicle for delivering a service (for example, a navigation apparatus 114 in the second embodiment described later), and the shop side terminal comprises an information storing device (for example, an information storing section 154 in the second embodiment described later) for storing the route information or the position information, and the navigation apparatus obtains the route information or the position information stored in the information storing device.

According to the service delivery system having the above construction, the route information or the position information generated by the route information generation device of the shop side terminal is stored in a computer readable recording medium, for example, a memory such as a hard disk built in to the computer system, or a floppy disk, a magneto-optical disk, a ROM, a CD-ROM, or a portable medium such as an IC card having a flash memory therein.

The navigation apparatus in the delivery vehicle obtains the route information by connecting to the route information storing device via a communication circuit, or by directly reading the route information from a portable medium carried into the delivery vehicle.

In this case, the obtained route information is displayed on the display screen of the navigation apparatus, and hence the delivery vehicle can move to the delivery destination immediately, thereby enabling the delivery business to be quickly performed.

Moreover, a service delivery system of a ninth aspect of the invention is characterized in that the navigation apparatus comprises; a communication device connected to at least one of the client side terminal, the shop side terminal and the information server so as to be able to communicate therewith (for example, a communication section 162 in the embodiment described later), and a vehicle side route information generation device for generating route information for a route to the delivery destination based on the position information received from the information server via the communication device (for example, a route information generation section 164 in the second embodiment described later).

According to the service delivery system having the above construction, since a movable body such as a delivery vehicle can directly receive the order information from the client side terminal without including the shop side terminal therebetween, to generate the route information, efficiency of the delivery business can be further improved.

As described above, according to the service delivery system of the fifth aspect of the invention, since the position information (for example, latitude and longitude) for the delivery destination on the map is attached to the order information, the position of the delivery destination is immediately displayed on the map display screen of the shop side display device of the shop side terminal. Based on the position information for the delivery destination and the current position information for the delivery vehicle, the route information can be generated quickly, thereby enabling the efficiency of the delivery business to be improved.

Moreover, since the information server comprises the order information storing device, and the order information is reliably transmitted to the shop side terminal on a predetermined date, for example, the situation can be prevented where transmission of the order information from the client side terminal is forgotten or an ordering error occurs.

Furthermore, according to the service delivery system of the sixth aspect of the invention, since the product information can be registered from the shop side terminal, for example, product information satisfying search conditions can be easily searched from various product information.

According to the service delivery system of the seventh aspect of the invention, for example, it is not necessary to hold the map information separately in the client side terminal and the shop side terminal. Hence the construction of the system can be simplified to perform efficient processing.

Also, according to the service delivery system of the eighth aspect of the invention, the obtained route information is displayed on the display screen of the navigation apparatus. Hence the delivery vehicle can move to the delivery destination immediately, thereby enabling the delivery business to be quickly performed.

Moreover, according to the service delivery system of the ninth aspect of the invention, since a movable body such as a delivery vehicle can directly receive the order information from the client side terminal without including the shop side terminal therebetween, to generate the route information, efficiency of the delivery business can be further improved.

BRIEF DESCRIPTION OF THE DRAWINGS

FIG. 5 is a diagram showing a display screen in a display section of a client side terminal device.

FIG. 6 is a diagram showing a display screen in a display section of a client side terminal device.

PREFERRED EMBODIMENTS

First Embodiment of the Invention

Figure 1:
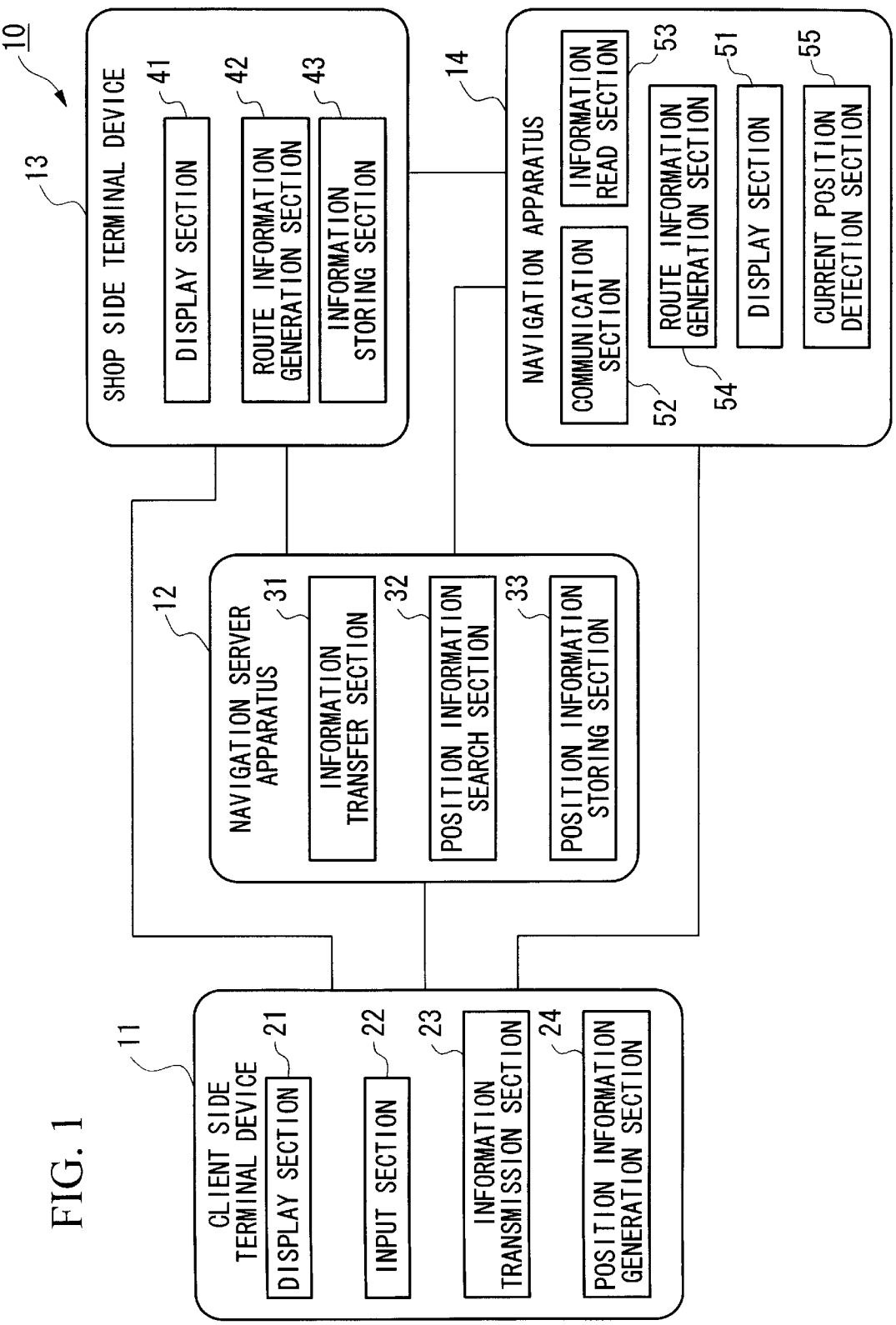
FIG. 1 is a block diagram of a service delivery system according to a first embodiment of the present invention.

A service delivery system according to a first embodiment of the present invention will now be described with reference to the accompanying drawings. FIG. 1 is a block diagram of a service delivery system 10 according to the first embodiment of the present invention.

The service delivery system 10 according to the first embodiment comprises; a client side terminal device 11, being for example a user terminal, a navigation server apparatus 12, a shop side terminal device 13, and a navigation apparatus 14 furnished in a delivery vehicle on the shop side.

The client side terminal device 11 is constituted by a computer apparatus or a navigation apparatus connected to the navigation server apparatus 12 on the Internet and the shop side terminal device 13 so as to be able to communicate therewith via a portable terminal or the like which a client has, and comprises a display section 21, an input section 22, an information transmission section 23 and a position information generation section 24.

The display section 21 displays map information indicating the position or the like of a delivery destination or the client side terminal device 11, and displays various information transmitted from the navigation server apparatus 12, at the time of ordering of various services including products. The input section 22 inputs, for example, each input item related to the order information.

The information transmission section 23 transmits order information related to the delivery of various services, for example, in the form of E-mail or the like, to the navigation server apparatus 12, the shop side terminal device 13 or the navigation apparatus 14.

Here, the order information comprises, in addition to the product information, for example, the address, name and telephone number of a client as the client's information, and the address, name (or designation) and telephone number for a delivery destination as information for the delivery destination. It is also possible to attach position information (for example, latitude and longitude) for the delivery destination on the map and information such as specified delivery date.

Product information herein stands for not only various goods to be delivered, but also the information related to offering of various services which requires movement to a predetermined position instructed by the client side terminal device 11, such as a repair service performed at a client site or a pick-up service.

The position information generation section 24 generates position information on the map (for example, latitude and longitude), based on the address of the delivery destination and the map information stored in the map information storing section (not shown).

The navigation server apparatus 12 is provided, for example, on the Internet, and comprises an information transfer section 31, a position information search section 32 and a position information storing section 33.

The information transfer section 31 receives the order information transmitted from the client side terminal device 11, and depending on the content of the order information, for example, in the case where the position information on the map (for example, latitude and longitude) is not attached, attaches the position information in addition to the address of the delivery destination, and transmits the information to a predetermined shop side terminal device 13 or the navigation apparatus 14.

The position information search section 32 searches the position information (for example, latitude and longitude on the map) stored in the position information storing section 33, based on for example the address of the delivery destination, depending on the content of the order information transmitted from the client side terminal device 11.

The position information storing section 33 stores the information indicating correspondence, for example, between the address and the position information (for example, latitude and longitude) on the map.

The shop side terminal device 13 comprises, for example, a display section 41, a route information generation section 42 and an information storing section 43.

The display section 41 adds the position information for the delivery destination included in the order information received from the client side terminal device 11 and the route information to the map information stored, for example, in the map information storing section (not shown), and displays this information.

The route information generation section 42 generates the route information for a route to the delivery destination, based on the position information included in the order information received from the client side terminal device 11.

The information storing section 43 stores the order information, or the position information included in the order information and the route information, in a computer readable recording medium, for example a memory such as a hard disk built in to the computer system, or a floppy disk, a magneto-optical disk, a ROM, a CD-ROM, or a portable medium 43a such as an IC card having a flash memory therein.

Here portable recording medium (portable medium 43a) may be a recording medium capable of repeatedly reading and writing, or a portable terminal having the equivalent recording medium, for example, a mobile phone, a PHS (Personal Handy-Phone System), a portable game machine, a personal computer or the like.

The navigation apparatus 14 constitutes a navigation apparatus for vehicles, furnished in a delivery vehicle owned by, for example, a shop or the like, and connected to the client side terminal device 11, the navigation server apparatus 12 and the shop side terminal device 13 so as to be able to communicate therewith, via a portable terminal or the like owned by, for example, a driver.

The navigation apparatus 14 comprises, for example, a display section 51, a communication section 52, an information read section 53, a route information generation section 54, and a current position detection section 55.

The display section 51 adds the position information for the delivery destination included in the order information and the route information, to the map information stored, for example, in the map information storing section (not shown), and displays this information, and also displays various information transmitted from the navigation server apparatus 12 and the shop side terminal device 13.

The communication section 52 constitutes a portable terminal, for example, a mobile phone or the like, carried by a driver or a passenger, and is connected to the client side terminal device 11, the navigation server apparatus 12 and the shop side terminal device 13 so as to be able to communicate therewith, and receives the order information.

The information read section 53 reads the recorded contents in a portable recording medium in which the order information and the route information are recorded by, for example, the information recording section 43 of the shop side terminal device 13.

The route information generation section 54 generates the route information for a route to the delivery destination, based on the position information for the delivery destination included in the order information received by the communication section 52, or the order information read by the information read section 53, and the current position information for the own vehicle.

Therefore, the current position detection section 55 is connected to the route information generation section 54, and calculates the current position of the vehicle, based on a positioning signal such as a GPS (Global Position System) signal for measuring the position of the vehicle, for example, by utilizing satellites, road traffic information such as VICS (Vehicle Information & Communication System) information, and the processing in an autonomous navigation section (not shown) consisting of a yaw rate sensor such as a gyro sensor and an accelerometer. The current position detection section 55 also performs map matching or the like with respect to the map information.

Figure 2:
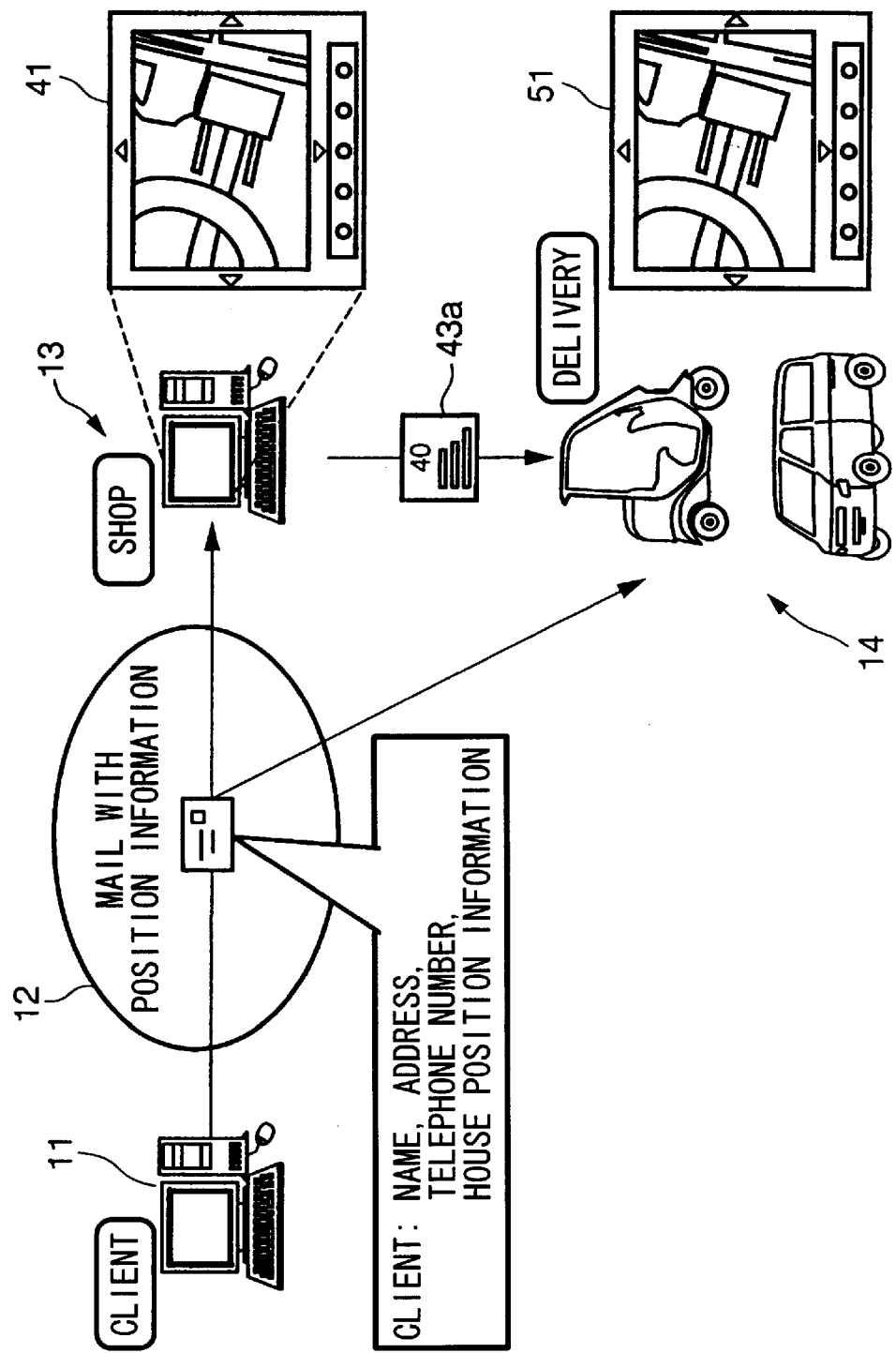
FIG. 2 is a diagram showing the flow of order information in the service delivery system.

The service delivery system 10 according to the first embodiment has the above described construction. The operation of this service delivery system 10 will now be described with reference to the accompanying drawings. FIG. 2 is a diagram showing the flow of the order information in the service delivery system 10.

For example, an instance where a failure has occurred in a vehicle mounted with the client side terminal device 11, and a rescue request is transmitted will be described below.

At first, as shown in FIG. 2, when a failure occurs in a vehicle on the client side, the client side terminal device 11 is connected to the navigation server apparatus 12, and selects an item of a rescue service or the like at the time of vehicle failure from the product information preliminarily set, to thereby transmit the order information.

In this situation, in the case where the client side terminal device 11 comprises the current position detection section (not shown) for detecting the current position based on the positioning signal such as a GPS signal or the like, the current position information may be added to the order information and transmitted, for example, by specifying the vehicle position on the map display screen in the display section 21 of the client side terminal device 11, or in the case where the current position cannot be detected, only the order information for the rescue request may be transmitted.

Next, the navigation server apparatus 12 having received the order information judges whether the position information (for example, latitude and longitude) is added to the order information or not, and in the case where the position information is not attached, determines the current position of the client side terminal device 11 and generates the position information. Then, the navigation server apparatus 12 transmits the order information including the position information attached thereto to the shop side terminal device 13 or the navigation apparatus 14 furnished in the delivery vehicle, for example, in the form of E-mail.

The shop side terminal device 13 or the navigation apparatus 14 having received the position information for the delivery destination together with the order information generates the route information for a route to the delivery destination based on the address of the delivery destination and the position information, and displays the route information together with the map information on the display screen of the respective display sections 41 and 51.

Then, the delivery vehicle moves to the client's vehicle having the failure, based on the route information on the map display screen.

As described above, according to the service delivery system 10 of the first embodiment, the position information (for example, latitude and longitude) for the delivery destination on the map is attached to the order information transmitted from the client side terminal device 11 to the shop side terminal device 13. Hence, the position of the delivery destination is immediately displayed on the map display screen in the display section 41 of the shop side terminal device 13 having received the order information. As a result, the route information can be quickly generated based on the position information for the delivery destination and the current position information for the delivery vehicle, thereby enabling the efficiency of the delivery business to be improved.

Moreover, since the navigation apparatus 14 mounted in the delivery vehicle or the like can directly receive the order information from the client side terminal device 11 without including the navigation apparatus 12 and the shop side terminal device 13 therebetween, to generate the route information, the efficiency of the delivery business can be further improved.

In the above described embodiment, the service delivery system 10 comprises the client side terminal device 11, the navigation server apparatus 12, the shop side terminal device 13 and the navigation apparatus 14. However, the present invention is not limited thereto, and the navigation server apparatus 12 may be omitted.

In this case, in the order information transmitted from the client side terminal device 11 to the shop side terminal device 13 and the navigation apparatus 14, in addition to the product information, the address, name and telephone number of a client as the client's information, the address, name (or designation) and telephone number for the delivery destination as the information for the delivery destination, and position information (for example, latitude and longitude) on the map for the delivery destination and specified delivery date need only be included.

In the above described embodiment, the position information for the delivery destination and the route information are added to the map information and displayed in the display section 41 of the shop side terminal device 13 and the display section 51 of the navigation apparatus 14. However, the present invention is not limited thereto, and for example, road traffic information such as VICS (Vehicle Information & Communication System) information may be received and additional information such as traffic jam information or restriction information may be displayed on the map screen.

Second Embodiment of the Invention

Figure 3:
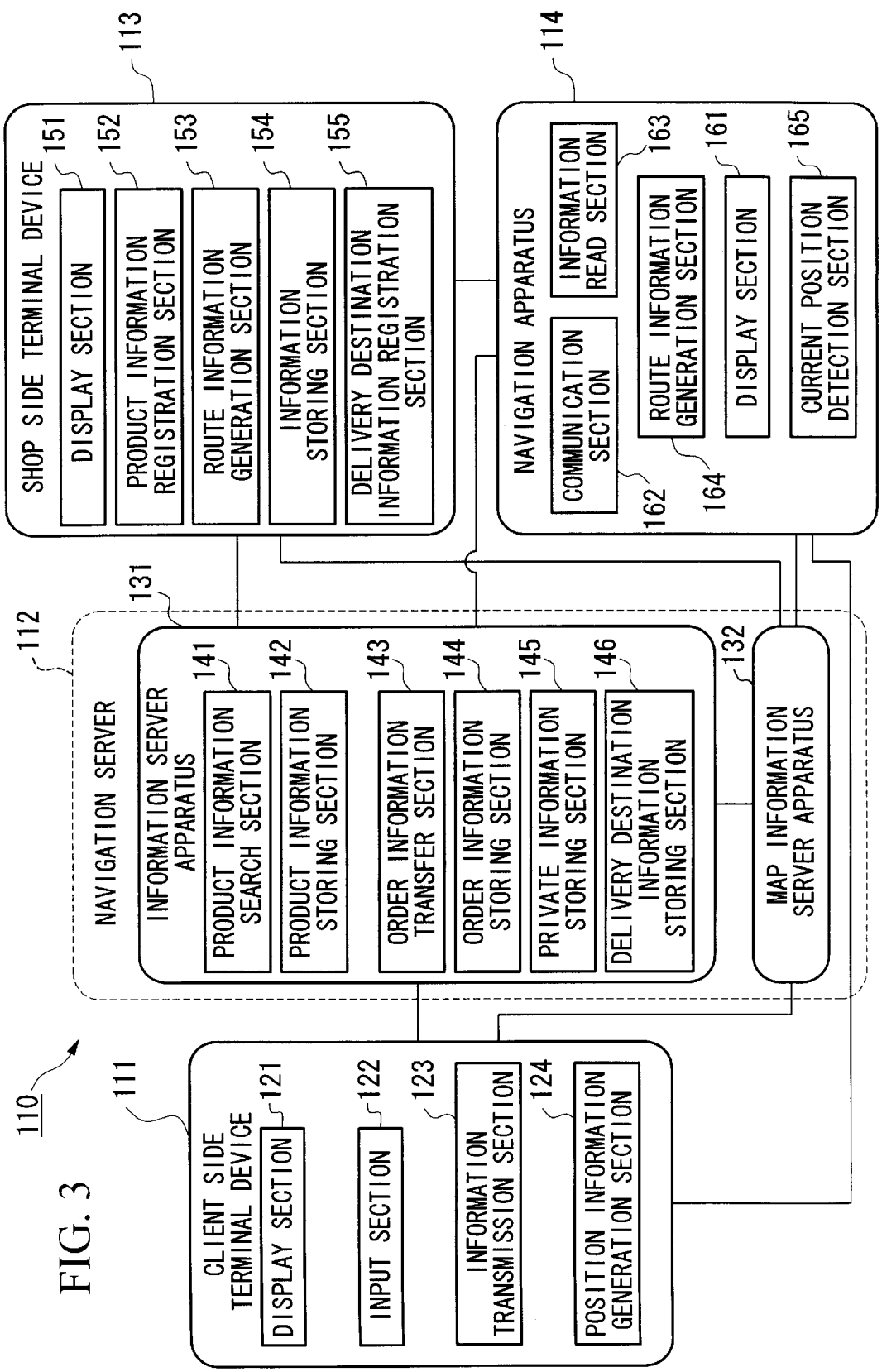
FIG. 3 is a block diagram of a service delivery system according to a second embodiment of the present invention.

A service delivery system according to a second embodiment of the present invention will now be described with reference to the accompanying drawings. FIG. 3 is a block diagram of a service delivery system 110 according to the second embodiment of the present invention.

The service delivery system 10 according to the second embodiment comprises; a client side terminal device 111, being for example a user terminal, a navigation server apparatus 112, a shop side terminal device 113, and a navigation apparatus 114 furnished in a delivery vehicle on the shop side.

The client side terminal device 111 is constituted by a computer apparatus or a navigation apparatus connected to the navigation server apparatus 112 on the Internet so as to be able to communicate therewith via a portable terminal or the like which a client has, and comprises a display section 121, an input section 122, an information transmission section 123 and a position information generation section 124.

The display section 121 displays map information indicating the position or the like of a delivery destination or the client side terminal device 111, and displays various information transmitted from the navigation server apparatus 112, at the time of ordering of various services including products.

The input section 122 inputs, for example, each input item related to the order information and private information, an instruction for search with respect to the product information stored in the navigation server 112, an instruction for selection with respect to various information presented from the navigation server 112, and the like.

The product information herein is not only the information for various goods to be delivered, but also the information related to offering of various services which require movement to a predetermined position instructed by the client side terminal device 111, such as a repair service performed at a client site or a pick-up service.

The information transmission section 123 transmits the order information and private information related to the delivery of various services to the navigation server 112.

Here, the order information comprises, for example, the address, name and telephone number of a client as the client's information, and the address, name (or designation), telephone number and position information on the map (for example, latitude and longitude) for a delivery destination as the information for the delivery destination, and specified delivery date.

The private information is the information related to not only the client's acquaintances and friends, spouse or a specific person, but also various groups and enterprises having relations with the client, and comprises the address, name (or designation) and telephone number, and the position information on the map, as well as information related to a predetermined date such as a birthday or anniversary, gender, preference information or the like.

The position information generation section 124 generates the position information (for example, latitude and longitude) on the map for the delivery destination, based on the address of the delivery destination and the map information received from the map information server apparatus 132 or the like.

The navigation server 112 is provided, for example, on the Internet, and comprises an information server apparatus 131 and a map information server apparatus 132.

The information server apparatus 131 comprises, for example, a product information search section 141, a product information storing section 142, an order information transfer section 143, an order information storing section 144, a private information storing section 145 and a delivery destination information storing section 146.

The product information search section 141 searches product information stored in the product information storing section 142, based on; the search instruction transmitted, for example, from the client side terminal device 111, the order information stored in the order information storing section 144, and private information stored in the private information storing section 145.

The product information storing section 142 constitutes, for example, a storage medium provided in each shop, for storing various product information registered from the shop side terminal device 113.

The order information transfer section 143 receives the order information transmitted from the client side terminal device 111, and transmits the order information to a predetermined shop side terminal device 113 or stores the order information in the order information storing section 144, depending on the contents of the order information.

The order information storing section 144 is, for example, a storage medium provided for each client, for storing the order information transmitted from the client side terminal device 111.

The private information storing section 145 is, for example, a storage medium provided for each client, for storing the private information transmitted from the client side terminal device 111.

The delivery destination information storing section 146 constitutes, for example, a storage medium provided for each shop, for storing the delivery destination information related to the delivery destination registered by, for example, the shop side terminal device 113, that is, the address and name (or a designation) and telephone number for the delivery destination, and position information on the map (for example, latitude and longitude) and the route information.

The map information server apparatus 132 is connected to the client side terminal device 111, the shop side terminal device 113 and the navigation apparatus 114, respectively, so as to be able to communicate therewith, for transmitting the map information displayed on the respective display sections 121, 151 and 161.

The shop side terminal device 113 comprises, for example, a display section 151, a product information registration section 152, a route information generation section 153, an information storing section 154, and a delivery destination information registration section 155.

The display section 151 adds the position information for the delivery destination included in the order information received from the client side terminal device 111 via the navigation server 112 and the route information, to the map information received, for example, from the map information server apparatus 132, and displays this information, and also displays various information transmitted from the navigation server 112.

The product information registration section 152 registers the product information in the product information storing section 142 of the information server apparatus 131.

The route information generation section 153 generates the route information for a route to the delivery destination, based on the position information included in the order information received from the client side terminal device 111, via the navigation server 112.

The information storing section 154 stores the order information, or the position information included in the order information and the route information, in a computer readable recording medium, for example a memory such as a hard disk built in to the computer system, or a floppy disk, a magneto-optical disk, a ROM, a CD-ROM, or a portable medium 154a such as an IC card having a flash memory therein.

Here portable recording medium (portable medium 154a) may be a recording medium capable of repeatedly reading and writing, or a portable terminal having the equivalent recording medium, for example, a mobile phone, a PHS, a portable game machine, a personal computer or the like.

The delivery destination information registration section 155 registers the delivery destination information, that is, the address, name (or a designation) and telephone number, and position information on the map (for example, latitude and longitude) and the route information, in the delivery destination information storing section 146 of the information server apparatus 131.

The navigation apparatus 114 constitutes a navigation apparatus for vehicles, furnished in a delivery vehicle owned by, for example, a shop or the like, and connected to the client side terminal device 111, the navigation server apparatus 112 and the shop side terminal device 13 so as to be able to communicate therewith, via a portable terminal or the like owned by, for example, a driver or a passenger.

The navigation apparatus 114 comprises, for example, a display section 161, a communication section 162, an information read section 163, a route information generation section 164, and a current position detection section 165.

The display section 161 adds the position information for the delivery destination included in the order information and the route information, to the map information received, for example, from the map information server apparatus 132, and displays this information, and also displays various information transmitted from the navigation server apparatus 112 and the shop side terminal device 113.

The communication section 162 constitutes a portable terminal, for example, a mobile phone or the like, carried by a driver or a passenger, and is connected to the client side terminal device 111, the navigation server apparatus 112 and the shop side terminal device 113 so as to be able to communicate therewith, and receives the order information, in particular the position information for the delivery destination included in the order information.

The information read section 163 reads the recorded contents in a portable recording medium in which the order information are recorded by, for example, the information recording section 154 of the shop side terminal device 113.

The route information generation section 164 generates the route information for a route to the delivery destination, based on the position information for the delivery destination included in the order information received by the communication section 162, or the order information read by the information read section 163, and the current position information for the own vehicle.

Therefore, the current position detection section 165 is connected to the route information generation section 164, and calculates the current position of the vehicle, based on a positioning signal such as a GPS (Global Position System) signal for measuring the position of the vehicle, for example, by utilizing satellites, road traffic information such as VICS (Vehicle Information & Communication System) information, and the processing in an autonomous navigation section (not shown) consisting of a yaw rate sensor such as a gyro sensor and an accelerometer. The current position detection section 165 also performs map matching or the like with respect to the map information received for example from the map information server apparatus 132.

The service delivery system 110 according to the second embodiment has the above described construction. The operation of this service delivery system 110 will now be described with reference to the accompanying drawings.

Figure 4:
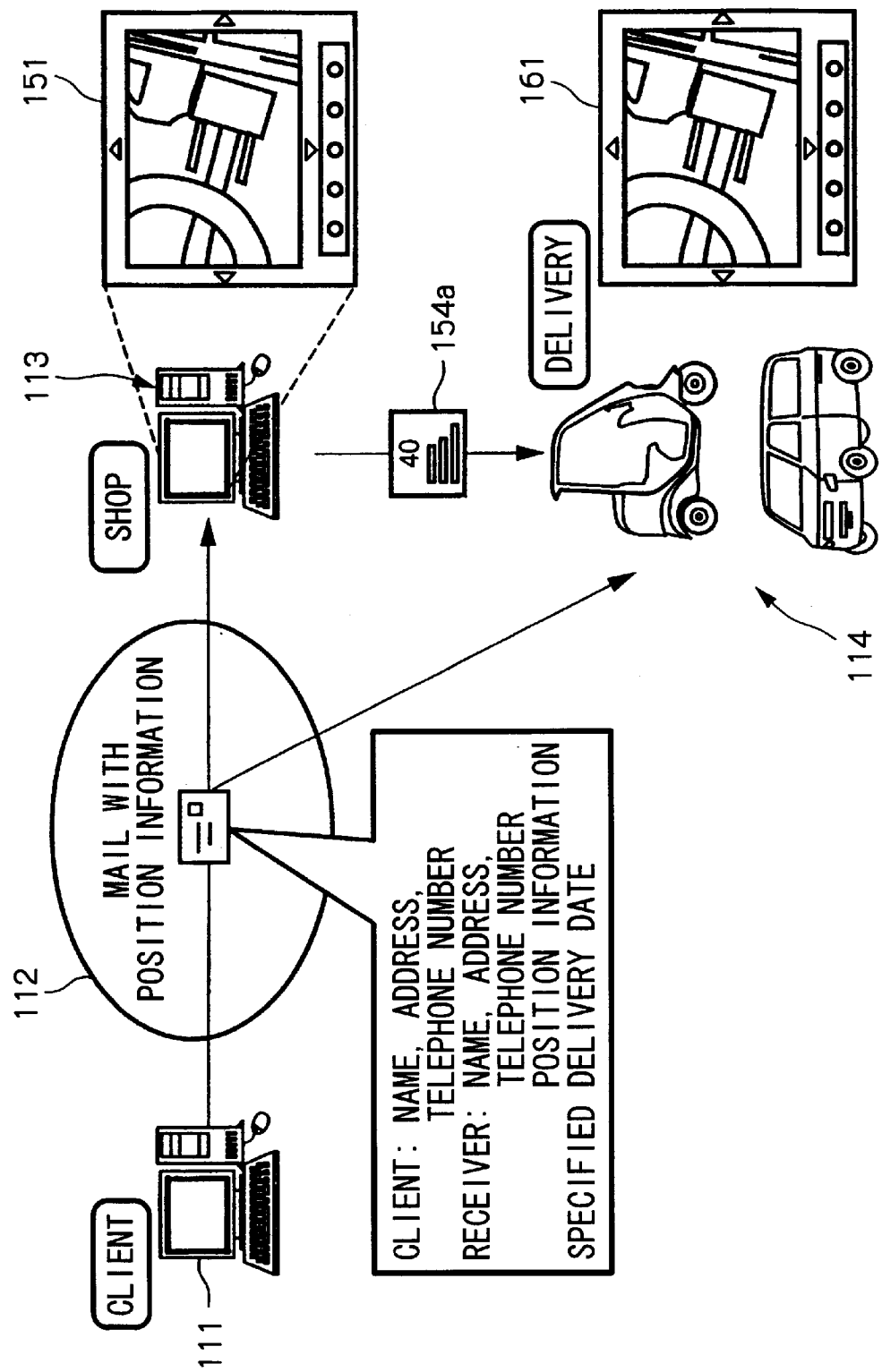
FIG. 4 is a diagram showing the flow of order information in the service delivery system of this embodiment.
Figure 7:
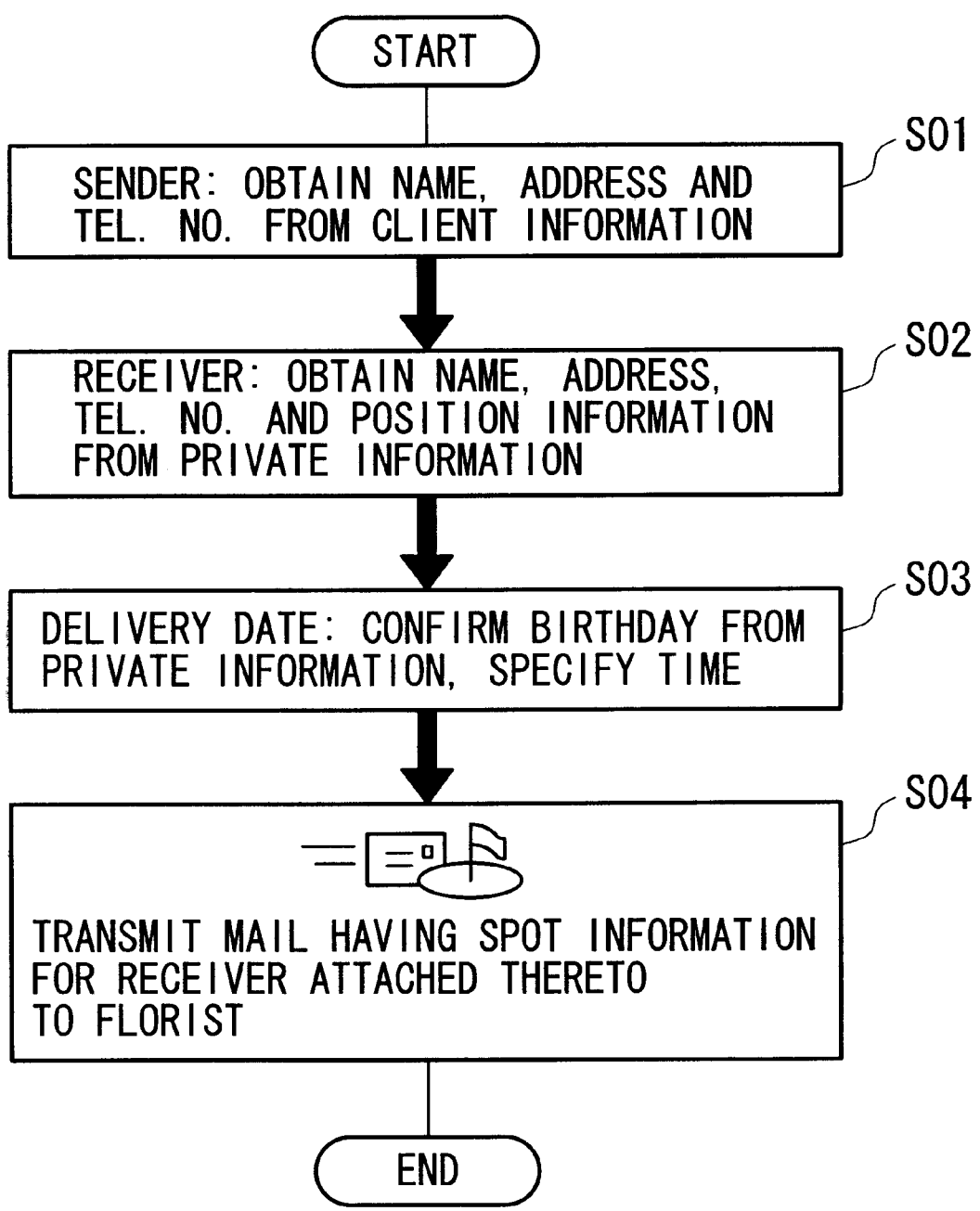
FIG. 7 is a flowchart showing the operation of a navigation server.
Figure 8A:
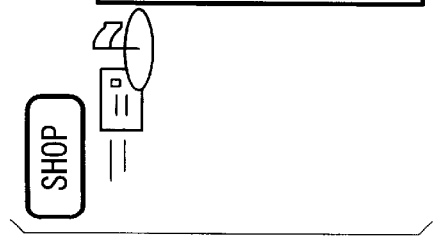
FIGS. 8A to 8C are diagrams showing a display screen in a display section of a shop side terminal device.
Figure 8B:
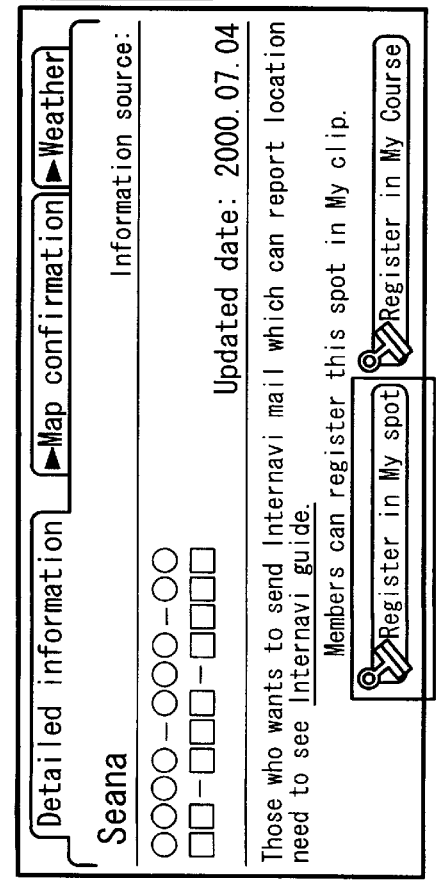
Figure 8C:
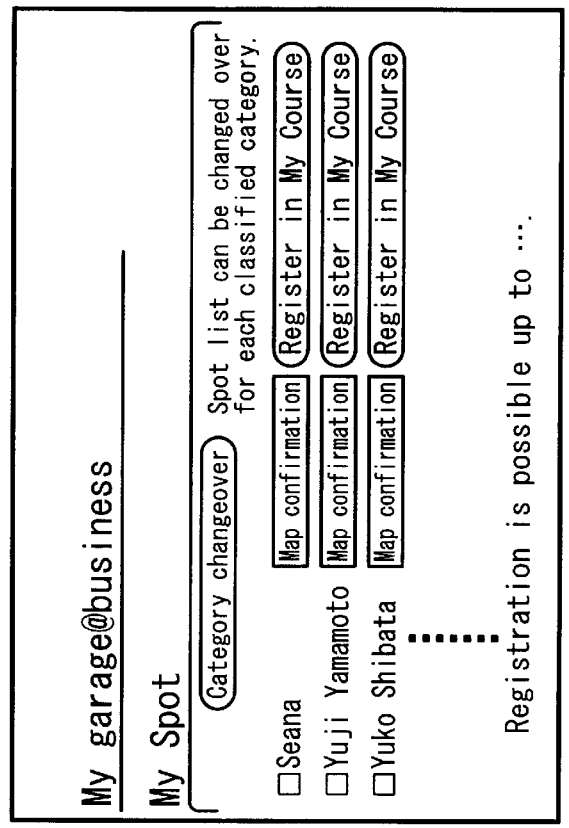

FIG. 4 is a diagram showing the flow of order information in the service delivery system 110, and FIG. 5 and FIG. 6 are diagrams showing the display screen in the display section 121 of the client side terminal device 111. FIG. 7 is a flowchart showing the operation of the navigation server 112, and FIGS. 8A to 8C are diagrams showing the display screen in the display section 151 of the shop side terminal device 113.

At first, as shown in FIG. 4, the client side terminal device 111 transmits the order information and the private information to the navigation server 112.

Then, the navigation server 112 having received the order information and the private information stores the order information in the order information storing section 144, in the case where the period until the specified delivery date specified by the order information is relatively long, and at a point in time near to the specified delivery date, generates an E-mail in which the position information (for example, latitude and longitude) on the map for the delivery destination is added to the order information, to transmit the information to the shop side terminal device 113 or the navigation apparatus 114 furnished in a delivery vehicle.

Then, the shop side terminal device 113 or the navigation apparatus 114 generates the route information for a route to the delivery destination and displays the route information together with the map information on the display screen of the respective display sections 151 and 161.

Moreover, the navigation apparatus 114 having received the private information from the client side terminal device 111 stores the private information in the private information storing section 145. At a point in time near to a predetermined date consisting of, for example, a birthday or an anniversary described in the private information, the navigation apparatus 114 searches the product information stored in the product information storing section 142, depending on the description content of the private information, for example, gender and preference information, and transmits this search result to the client side terminal device 111 as so-called recommendation information.

Here, the recommendation information transmitted to the client side terminal device 111 may comprise, for example, a text file, image data or the like. For example, as shown in FIG. 5 and FIG. 6, link information to a Web page prepared on an appropriate HTTP (Hyper Text Transfer Protocol) server may be included.

For example, as shown in FIG. 5, when a client having received the recommendation information displays a Web page provided with respect to the client side terminal device 111 on the display section 121, a character string indicating a link to the product information (for example, "How about sending a rose bouquet!" shown in FIG. 5) is displayed. When this character string is selected via the input section 122 or the like, for example, as shown in FIG. 6, the product information (for example, bouquet 1 to bouquet 4 shown in FIG. 6) searched by the navigation server 112 is displayed.

When the client selects a suitable product on the display screen of the product information, the order information is transmitted to the navigation server 112.

The navigation server 112 having received the order information based on the recommendation information first obtains the address, name and telephone number of the sender, based on the private information stored in the information server apparatus 131.

Next, in step S02, the navigation server 112 obtains the address, name and telephone number for the delivery destination (the receiver), and the position information on the map (for example, latitude and longitude), based on the private information stored in the private information storing section 145.

In step S03, the navigation server 112 obtains a predetermined date consisting of, for example, a birthday or an anniversary based on the private information stored in the private information storing section 145, to confirm the specified delivery date, and determine the delivery time, according to need.

In step S04, the navigation server 112 generates a Web page or the like as spot information, in which the address, name and telephone number for the delivery destination, and the position information on the map are described, and also generates an E-mail describing order information and transmits the E-mail together with the link information to the Web page, to the shop side terminal device 113.

As shown in FIG. 8A, the shop side terminal device 113 having received the E-mail, in which the order information and the link information to the spot information are described, generates the route information for a route to the delivery destination based on the order information and performs delivery of various services including products.

At this time, if a character string (for example, "http://www. . . . " shown in FIG. 8A) indicating a link to the spot information is selected on the display screen of the received E-mail, as shown in FIG. 8B, the Web page describing the address, name and telephone number and the position information on the map for the delivery destination is displayed.

On the display screen of this Web page, there is displayed a character string (for example, "Register in My spot" shown in FIG. 8B) for registering this spot information as the information peculiar to each shop. By selecting this character string, for example, as shown in FIG. 8C, a list display screen of the registered spot information is displayed.

In this list display screen, searching based on the address, name and telephone number for each spot information and various classification can be displayed.

Moreover, display of the route information with respect to each delivery destination and registration of the route information as the information peculiar to each shop are also made possible.

As described above, according to the service delivery system 110 of the second embodiment, the position information (for example, latitude and longitude) for the delivery destination on the map is attached to the order information transmitted from the client side terminal device 111 to the shop side terminal device 113. Hence, the position of the delivery destination is immediately displayed on the map display screen in the display section 141 of the shop side terminal device 113 having received the order information. As a result, the route information can be quickly generated based on the position information for the delivery destination and the current position information for the delivery vehicle, thereby enabling the efficiency of the delivery business to be improved.

Furthermore, since the navigation apparatus 114 mounted in the delivery vehicle or the like can directly receive the order information from the information server apparatus 131 without including the shop side terminal device 13 therebetween, to generate the route information, the efficiency of the delivery business can be further improved.

Moreover, since the information server apparatus 131 comprises the order information storing section 144, and transmits the order information reliably on a predetermined date to the shop side terminal device 113, for example, the situation can be prevented where transmission of the order information from the client side terminal device 111 is forgotten, or an ordering error occurs.

Furthermore, since the map information server apparatus 132 is provided, for example, it is not necessary that the client side terminal device 111 and the shop side terminal device 113 hold the map information separately. As a result, the construction of the system can be simplified to perform efficient processing.

In the above described embodiment, each storing section 142, 144, 145 and 146 is provided for each client and for each shop, but the present invention is not limited thereto, and for example, each storing section 142, 144, 145 and 146 may be commonly used for each client and for each shop. In this case, at the time of storing respective information, identification information for each client and identification information for each shop may be added and stored.

In the above described embodiment, the navigation apparatus 114 receives the map information from the map information server apparatus 132, but the present invention is not limited thereto, and for example, the navigation apparatus 114 may read the map data stored in a computer readable recording medium such as a CD-ROM and a DVD-ROM.

In the above described embodiment, the position information for the delivery destination and the route information are added to the map information and displayed in the display section 151 of the shop side terminal device 113 and the display section 161 of the navigation apparatus 114. However, the present invention is not limited thereto, and for example, road traffic information such as VICS (Vehicle Information & Communication System) information may be received and additional information such as traffic jam information or restriction information may be displayed on the map screen.

What is claimed is:

1. A service delivery system comprising: a client side terminal for ordering delivery of various services to a delivery destination, and a shop side terminal for receiving the order information and instructing delivery of the service to the delivery destination, wherein said client side terminal comprises client side display means for displaying map information and product information on a screen, and order information transmission means for attaching position information for said delivery destination to said order information and transmitting this combined information, and said shop side terminal comprises shop side display means for displaying map information and product information on a screen and route information generation means for generating route information for a route to said delivery destination based on said position information.

2. A service delivery system according to claim 1, comprising a navigation apparatus furnished in a vehicle for delivering said service, and said shop side terminal comprises route information storing means for storing said route information, and said navigation apparatus obtains said route information stored in said route information storing means.

3. A service delivery system according to claim 1, comprising a navigation apparatus furnished in a vehicle for delivering a service, and said navigation apparatus comprises communication means connected to said client side terminal so as to be able to communicate therewith, and vehicle side route information generation means for generating route information for a route to said delivery destination based on said position information received from said client side terminal via said communication means.

4. A service delivery system according to claim 1, comprising a server apparatus for transferring said order information transmitted from said client side terminal to said shop side terminal, and said server apparatus comprises position information attaching means for attaching position information for said delivery destination to said order information.

5. A service delivery system comprising: a client side terminal for ordering delivery of various services to a delivery destination, a shop side terminal for receiving the order information and instructing delivery of said service to said delivery destination, and an information server connected to said client side terminal and said shop side terminal so as to be able to communicate therewith, wherein said information server comprises order information storing means for storing a product name and a delivery date and position information for a delivery destination transmitted from said client side terminal, and order information transmission means for transmitting said product name and said delivery date and position information for said delivery destination to said shop side terminal, when it is said delivery date or a predetermined number of days before said delivery date, and said shop side terminal comprises display means for displaying the position of said delivery destination on a map display screen, based on the position information for said delivery destination, and route information generation means for generating route information for a route to said delivery destination based on the position information for said delivery destination.

6. A service delivery system according to claim 5, wherein said shop side terminal comprises product information registration means for registering product information in said information server, and said information server comprises product information storing means for storing said product information registered from said shop side terminal, and product information searching means for searching said product information stored in said product information storing means, when it is a predetermined number of days before said delivery date, and said order information is generated based on the searched product information and transmitted to said shop side terminal.

7. A service delivery system according to claim 5, comprising a map server connected to at least one of said client side terminal, said shop side terminal and said information server so as to be able to communicate therewith, and said client side terminal and said shop side terminal respectively comprise display means for displaying map information received from said map server.

8. A service delivery system according to claim 5, comprising a navigation apparatus furnished in a vehicle for delivering a service, and said shop side terminal comprises route information generation means for generating route information for a route to said delivery destination based on said position information, and information storing means for storing said route information or said position information, and said navigation apparatus obtains said route information or said position information stored in said information storing means.

9. A service delivery system according to claim 5, wherein said navigation apparatus comprises; communication means connected to at least one of said client side terminal, said shop side terminal and said information server so as to be able to communicate therewith, and vehicle side route information generation means for generating route information for a route to said delivery destination based on said position information received from said information server via said communication means.

* * * * *